US012757258B2

(12) United States Patent
Kumar et al.

(10) Patent No.: US 12,757,258 B2
(45) Date of Patent: Oct. 6, 2026

(54) METHOD AND APPARATUS FOR RECEIVING DOWNLINK DATA PACKETS OVER N3GPP ACCESS

(71) Applicant: SAMSUNG ELECTRONICS CO., LTD., Suwon-si (KR)

(72) Inventors: Lalith Kumar, Bangalore (IN); Anikethan Ramakrishna Vijaya Kumar, Bangalore (IN); Kundan Tiwari, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 424 days.

(21) Appl. No.: 17/756,359

(22) PCT Filed: Dec. 2, 2020

(86) PCT No.: PCT/KR2020/017489
§ 371 (c)(1),
(2) Date: May 23, 2022

(87) PCT Pub. No.: WO2021/112567
PCT Pub. Date: Jun. 10, 2021

(65) Prior Publication Data

US 2023/0007705 A1 Jan. 5, 2023

(30) Foreign Application Priority Data

Dec. 3, 2019 (IN) ............................. 201941049681
Nov. 27, 2020 (IN) ............................. 201941049681

(51) Int. Cl.
*H04W 76/10* (2018.01)
*H04W 60/04* (2009.01)
*H04W 84/04* (2009.01)

(52) U.S. Cl.
CPC ........... *H04W 76/10* (2018.02); *H04W 60/04* (2013.01); *H04W 84/042* (2013.01)

(58) Field of Classification Search
None
See application file for complete search history.

(56) References Cited

U.S. PATENT DOCUMENTS

2017/0127244 A1* 5/2017 Kumar .................. H04W 60/04
2018/0376444 A1 12/2018 Kim et al.
(Continued)

FOREIGN PATENT DOCUMENTS

CN 109565742 A 4/2019
CN 110100474 A 8/2019
(Continued)

OTHER PUBLICATIONS

International Search Report and Written Opinion of the International Searching Authority in connection with International Application No. PCT/KR2020/017489 issued Mar. 2, 2021, 9 pages.
(Continued)

*Primary Examiner* — Saad Khawar

(57) ABSTRACT

For receiving downlink data packets over Non-Third Generation Partnership Project (N3GPP) access, a User Equipment (UE) is configured to manage the triggering of Service Request procedures for receiving N3GPP Mobile Terminating (MT) packets in a coverage area of N3GPP access from a 5th Generation (5G) network. A Service Request procedure is triggered by the UE if the UE detects that the UE is in the coverage area of N3GPP access and that the UE is in 5th Generation Mobility Management (5GMM)-IDLE mode over N3GPP access and the back-off timer has expired. The detection is based on the UE determining that an access stratum connection is established between the UE and the 5G network over N3GPP access.

4 Claims, 4 Drawing Sheets

(56) References Cited

U.S. PATENT DOCUMENTS

| | | | | |
|---|---|---|---|---|
| 2019/0007992 | A1 | 1/2019 | Kim et al. | |
| 2019/0021064 | A1 | 1/2019 | Ryu et al. | |
| 2019/0059067 | A1 | 2/2019 | Lee et al. | |
| 2019/0166517 | A1 | 5/2019 | Niemi et al. | |
| 2019/0253935 | A1 | 8/2019 | Huang-Fu et al. | |
| 2019/0313473 | A1 | 10/2019 | Kim et al. | |
| 2020/0015309 | A1 | 1/2020 | Li et al. | |
| 2020/0389835 | A1* | 12/2020 | Talebi Fard | H04W 48/04 |
| 2021/0360569 | A1* | 11/2021 | Park | H04W 8/02 |
| 2022/0078871 | A1* | 3/2022 | Won | H04W 76/27 |

FOREIGN PATENT DOCUMENTS

| | | | |
|---|---|---|---|
| CN | 110199568 | A | 9/2019 |
| CN | 110393038 | A | 10/2019 |

OTHER PUBLICATIONS

Oppo, "UE IDLE over N3GPP responding to indication of DL data when access is available" 3GPP TSG-SA WG2 Meeting #136, S2-1911082 (rev of S2-1909213) Reno, Nevada, USA, Nov. 18-22, 2019, 5 pages.

Oppo, "UE in IDLE over non-3GPP access even when non-3GPP access is available" 3GPP TSG-SA2 Meeting #135, S2-1909212, Split, Croatia, Oct. 14-18, 2019, 3 pages.

Oppo, "UE IDLE over N3GPP responding to indication of DL data when access is available" 3GPP TSG-SA WG2 Meeting #136, S2-1911083 (rev of S2-1909214) Reno, Nevada, USA, Nov. 18-22, 2019, 11 pages.

European Patent Office, "Supplementary European Search Report," dated Nov. 8, 2022, in connection with European Patent Application No. 20896679.6, 10 pages.

Intellectual Property India, "Examination report under sections 12&13 of the Patents Act" dated Dec. 10, 2021, in connection with Indian Patent Application No. 201941049681, 7 pages.

Huawei et al., "Add attempt counter to Service Request procedure," 3GPP TSG-CT WG1 Meeting #111bis, C1-185812, West Palm Beach, FL (USA), Aug. 20-24, 2018, 11 pages.

The Second Office Action issued Apr. 18, 2025, in connection with Chinese Patent Application No. 202080083831.3, 14 pages.

Communication pursuant to Article 94(3) EPC dated May 13, 2025, in connection with European Patent Application No. 20896679.6, 8 pages.

Vivo, "Handling of PS Data Off status update," C1-192116, 3GPP TSG CT WG1 Meeting #116, Xian, P.R. of China, Apr. 8-12, 2019, 9 pages.

Office Action issued Oct. 30, 2024, in connection with Chinese Patent Application No. 202080083831.3, 26 pages.

Office Action dated Jul. 15, 2025, in connection with Chinese Application No. 202080083831.3, 12 pages.

* cited by examiner

METHOD AND APPARATUS FOR RECEIVING DOWNLINK DATA PACKETS OVER N3GPP ACCESS

CROSS-REFERENCE TO RELATED APPLICATIONS

This application is a 371 of International Application No. PCT/KR2020/017489, filed Dec. 2, 2020, which claims priority to Indian Patent Application No. 201941049681, filed Nov. 27, 2020, Indian Patent Application No. 201941049681, filed Dec. 3, 2019, the disclosures of which are herein incorporated by reference in their entirety.

BACKGROUND

1. Field

Embodiments herein relate to data reception in Non-Third Generation Partnership Project (N3GPP) access, and more particularly to methods and apparatus for managing triggering Service Request procedures for reception of downlink data packets over N3GPP access.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Currently, when a User Equipment (UE) in IDLE mode in Third Generation Partnership Project (3GPP) access intents to send Mobile Originating (MO) data to a network or receive Mobile Terminating (MT) data from the network (in response to a paging procedure), the UE can trigger a Service Request procedure to be in CONNECTED mode. The Service Request procedure involves the UE sending a Service Request message to the network. If the Service Request is accepted by the network, the UE can engage in data transfer. However, when the network is congested, the network may reject the Service Request and send a timer T3346 to indicate to the UE that the UE needs to refrain from sending further Service Requests prior to the expiry of the timer T3346. The UE can receive the timer T3346 in a Non-Access Stratum (NAS) signalling message and refrain from triggering the service request procedure prior to the expiry of the timer T3346. It may be noted that the UE may not intend to send MO data or receive MT data at the instance when the timer T3346 is expired. In such instance, the expiry of the timer T3346 is not a significant event for the UE and the UE does not trigger the service request procedure.

If the UE is registered on non-3GPP (N3GPP) access, the UE is always in CONNECTED mode and, hence, does not require triggering the service request procedure. The UE can send MO data or receive MT data at all times given the user plane resources are already active. If the UE moves out of N3GPP access coverage area, the UE comes to the IDLE mode. The UE may initiate a Service Request procedure if the UE detects that 3GPP access is available outside the N3GPP coverage area. However, if the network is congested, the UE may not be able to send MO data or receive MT data (due to triggering of T3346 timer by the network) on N3GPP access, even if the UE returns to the N3GPP access coverage area.

FIG. 1 is a sequence diagram depicting the triggering of service request by the UE only for sending MO data packets to the Access and Mobility Function (AMF) or for receiving MT data packets from the AMF, after the expiry of the back-off timer (timer 3346).

Consider that the UE(101) is registered with a Fifth Generation (5G) communication network. The UE(101) is connected to the AMF(102), which is a core network element of the 5G communication network. The UE(101) is in 5GMM (5G Mobility Management) REGISTERED NORMAL SERVICE state(step 105).

As depicted in FIG. 1, the UE(101) sends a Service Request (a NAS signalling message) to the AMF(102) of the 5G communication network over 3GPP access(step 110). The AMF(102) of the 5G communication network sends a Service Reject (a NAS signalling response message) over 3GPP access(step 115). The NAS signalling response message includes the cause of rejection of the Service Request and a timer T3346 to indicate to the UE that the UE needs to back-off from sending further Service Requests prior to the expiry of the timer T3346. After receiving the NAS signalling response message, the UE starts the timer T3346 (step 120).

At this instant, it is to be noted that the UE does not trigger a Service Request procedure after the expiry of the timer T3346(step 125, step 130). Further, after an 'x' time duration, the UE can trigger a Service Request procedure over 3GPP access only when the UE needs to send MO data packets to the 5G communication network(trigger-1) or when the UE needs to receive MT data packets from the 5G communication network(trigger-2).

In case of trigger-1, when the UE generates the MO data packets(step 135), the UE(101) sends the Service Request (the NAS signalling message) to the AMF(102) of the 5G communication network over 3GPP access to send the MO data packets(step 140).

In case of trigger-2, when the AMF(102) receives MT data intended for the UE(101)(step 145), the AMF(102) sends a paging message to the UE(101) over 3GPP access(step 150). In response to the paging message, the UE triggers the Service Request(step 155).

FIG. 2 is a sequence diagram depicting the rejection or dropping of downlink data packets by AMF due to non-reception of the downlink data packets by a UE.

As depicted in FIG. 2, consider that the UE(201) is registered with the 5G communication network. As the UE(201) is registered with the 5G communication network, the UE(201) is receiving 5GMM REGISTERED NORMAL SERVICE and is operating in 5GMM-CONNECTED mode over N3GPP access(step 205). Consider that the UE(201) has moved out of the service area over N3GPP access (coverage area of N3GPP access)(step 210).

Therefore, the UE(201) is in 5GMM-IDLE mode over N3GPP access. The UE(201) sends a Service Request or Registration Request (a NAS signalling message) to the AMF(202) of the 5G communication network over 3GPP access(step 215). Consider that the 5G communication network is congested. As such, the network may send a Service Reject or Registration Reject message (a NAS signalling response message) over 3GPP access(step 220). The NAS signalling response message includes a cause of congestion Information Element (IE) and a timer T3346 to indicate to the UE that the UE needs to back-off from sending further Service Requests prior to the expiry of the timer T3346. After receiving the NAS signalling response message, the UE starts the timer T3346(step 225).

Consider that the UE comes back within the coverage area of N3GPP access(step 230). The UE-NAS layer in the 5GMM-IDLE mode receives an indication, from the lower layers of N3GPP access, which informs that an access stratum connection has been established between the UE and the AMF. However, as the timer T3346 has not expired, the UE does not trigger a service request procedure over N3GPP access. The UE does not trigger a service request procedure over N3GPP access even if the timer T3346 expires, in case the UE does not have MO data to send. The UE triggers a Service Request procedure over N3GPP access, after the expiry of the timer T3346(step 235), when the UE needs to send MO data to the 5G communication network. Thus, the UE remains in 5GMM IDLE state over N3GPP access.

Prior to the UE triggering a Service Request procedure over N3GPP, if the AMF receives MT data intended for the UE(step 240), the AMF sends a paging message to the UE over 3GPP access(step 245). The paging message can be sent to the UE even if the Timer T3346 has not expired. The AMF can also send downlink NAS messages, apart from the paging message, such as downlink NAS TRANSPORT and messages for UE configuration update, even if the Timer T3346 has not expired.

When the AMF receives MT data intended for the UE over N3GPP access, the AMF sends a paging message with the access type set to N3GPP access over 3GPP access. This indicates that the AMF has received N3GPP MT data intended for the UE. The AMF, through the paging message, intends to determine a UE policy for reception of N3GPP downlink data packets over 3GPP access. The UE sends service request message over 3GPP access(step 250), in response to the paging message, wherein the service request message includes the policy that indicates to the AMF about the Protocol Data Unit (PDU) sessions of N3GPP access that are allowed by the UE to be converted to 3GPP access. The policy defines whether the UE has allowed a N3GPP PDU session, established for transfer of data over N3GPP access, to be shifted to 3GPP access. If the policy allows the PDU session to be shifted to 3GPP access and if data is pending to be delivered to the UE, then the PDU sessions are shifted to 3GPP access and the UE can receive N3GPP MT data over 3GPP access(Step 255). However, if the policy does not allow shifting the PDU session to 3GPP access, the AMF will be compelled to drop the N3GPP MT downlink data packets(step 255).

Thus, either the UE is unable to receive N3GPP MT downlink data packets over 3GPP access if the UE is in IDLE mode in the N3GPP coverage area, and the policy does not allow the PDU session to be shifted to 3GPP access; or unintentionally the PDU sessions are moved from N3GPP access to 3GPP access even though UE is in the N3GPP access coverage area.

SUMMARY

The principal object of the embodiments herein is to disclose methods and systems for managing the triggering of Service Request procedures by a User Equipment (UE) for receiving Mobile Terminating (MT) packets over Non-Third Generation Partnership Project (N3GPP) access.

Another object of the embodiments herein is to configure the UE to trigger a Service Request procedure if the UE detects that the UE is in N3GPP access coverage area, and if the UE detects that the UE is in Fifth Generation Mobility Management (5GMM)-IDLE mode over N3GPP access when a back-off timer has expired.

Accordingly, the embodiments provide methods and apparatus for receiving Mobile Terminating (MT) packets, by a User Equipment (UE), over Non-Third Generation Partnership Project (N3GPP) access. In an embodiment, consider that the UE has moved out of N3GPP access service area. The UE can transition from Fifth Generation Mobility Management (5GMM)-CONNECTED mode to 5GMM-IDLE mode over N3GPP access when the UE moves out of N3GPP access coverage area or N3GPP service area. When the UE is in the 5GMM-IDLE mode (after the UE moving out of the N3GPP service area) the UE sends a service request (a Non-Access Stratum (NAS) signaling message) to a Fifth Generation (5G) communication network for sending Mobile Originating (MO) data and MT data over 3rd Generation Partnership Project (3GPP)

access. If the 5G communication network is congested, the 5G communication network, on receiving the service request (the NAS signaling message) from the UE, activates a back-off timer. The UE is prevented from sending further service requests prior to the expiry of the back-off timer. The UE remains in the 5GMM-IDLE mode.

Consider that the UE has returned to the N3GPP access service area. The embodiments include detecting that the UE is in the coverage area of N3GPP access. The embodiments include detecting that the UE is in 5GMM-IDLE mode over N3GPP access. Thereafter, the UE, in the 5GMM-IDLE mode over N3GPP access, can receive an indication from lower layers of N3GPP access, that an access stratum connection is established between the UE and the 5G network over N3GPP access. The embodiments include determining that the back-off timer is activated. The UE can trigger a service request procedure by sending a service request message (a NAS signaling message) to the 5G communication network, for receiving MT (downlink) data packets, after the expiry of the back-off timer, through N3GPP access.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

Embodiments herein are illustrated in the accompanying drawings, through out which like reference letters indicate corresponding parts in the various figures. The embodiments herein will be better understood from the following description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and apparatus for managing the triggering of Service Request procedure, by a User Equipment (UE), for receiving Mobile Terminating (MT) packets in a service area of Non-Third Generation Partnership Project (N3GPP) access. The UE can be configured to trigger a Service Request procedure if the UE is in the coverage area of N3GPP access, and if the UE is in Fifth Generation Mobility Management (5GMM)-IDLE mode over N3GPP access.

Figure 1:
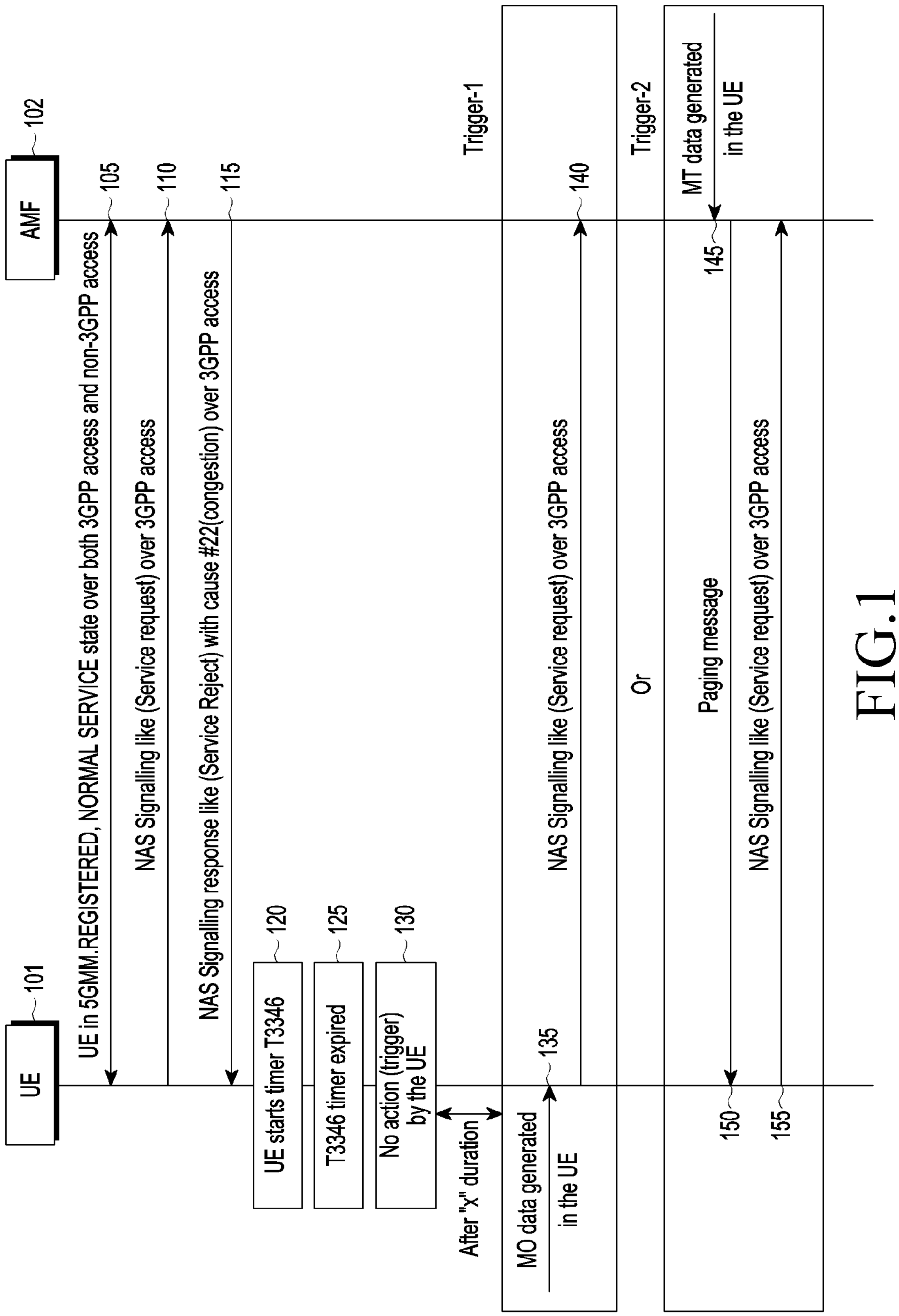
FIG. 1 is a sequence diagram depicting the triggering of service request by a User Equipment (UE) either for sending Mobile Originating (MO) data packets to an Access and Mobility Function (AMF) or for receiving Mobile Terminating (MT) data packets from the AMF.
Figure 2:
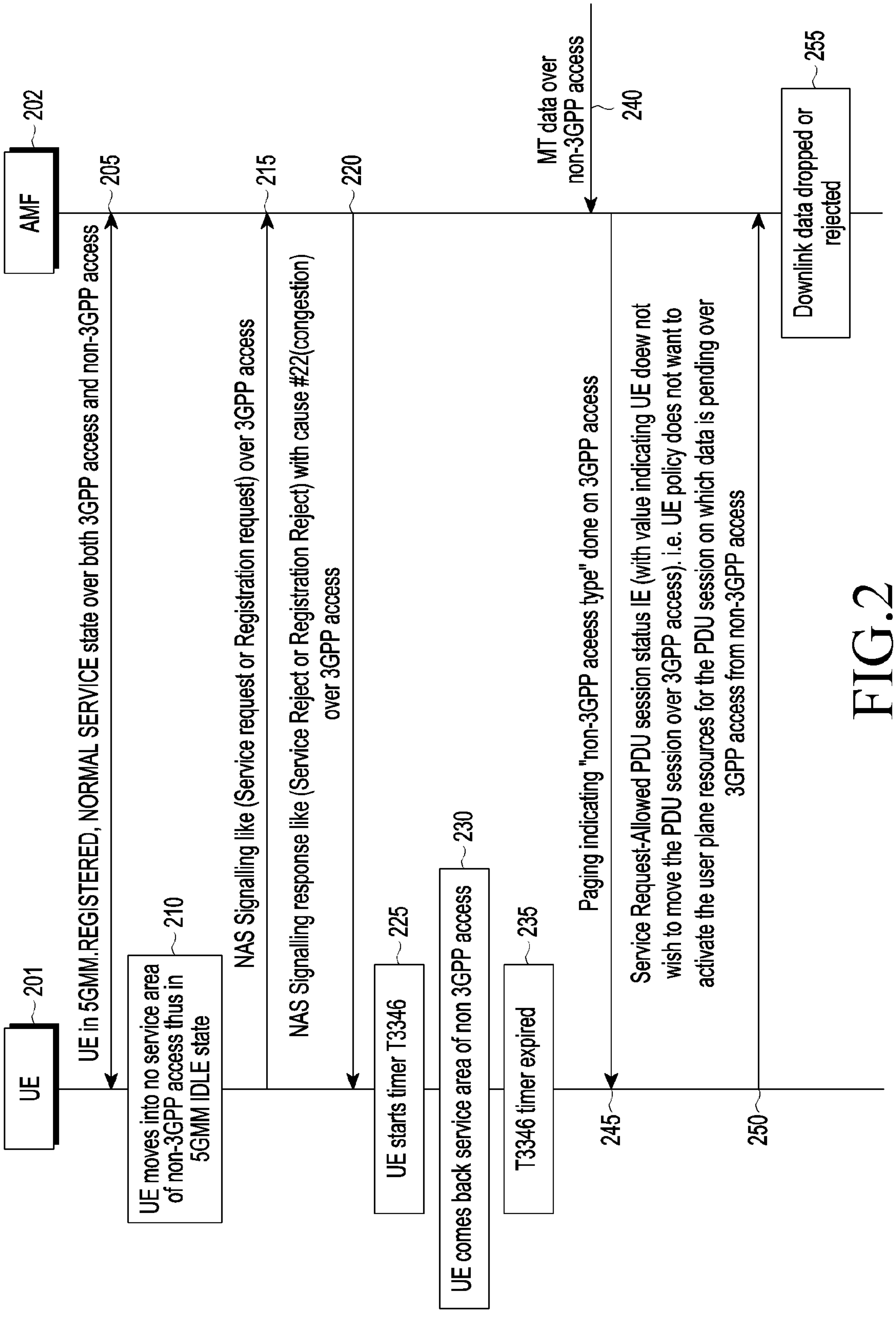
FIG. 2 is a sequence diagram depicting the rejection or dropping of downlink data packets by the AMF due to non-reception of the downlink data packets by the UE.
Figure 3:
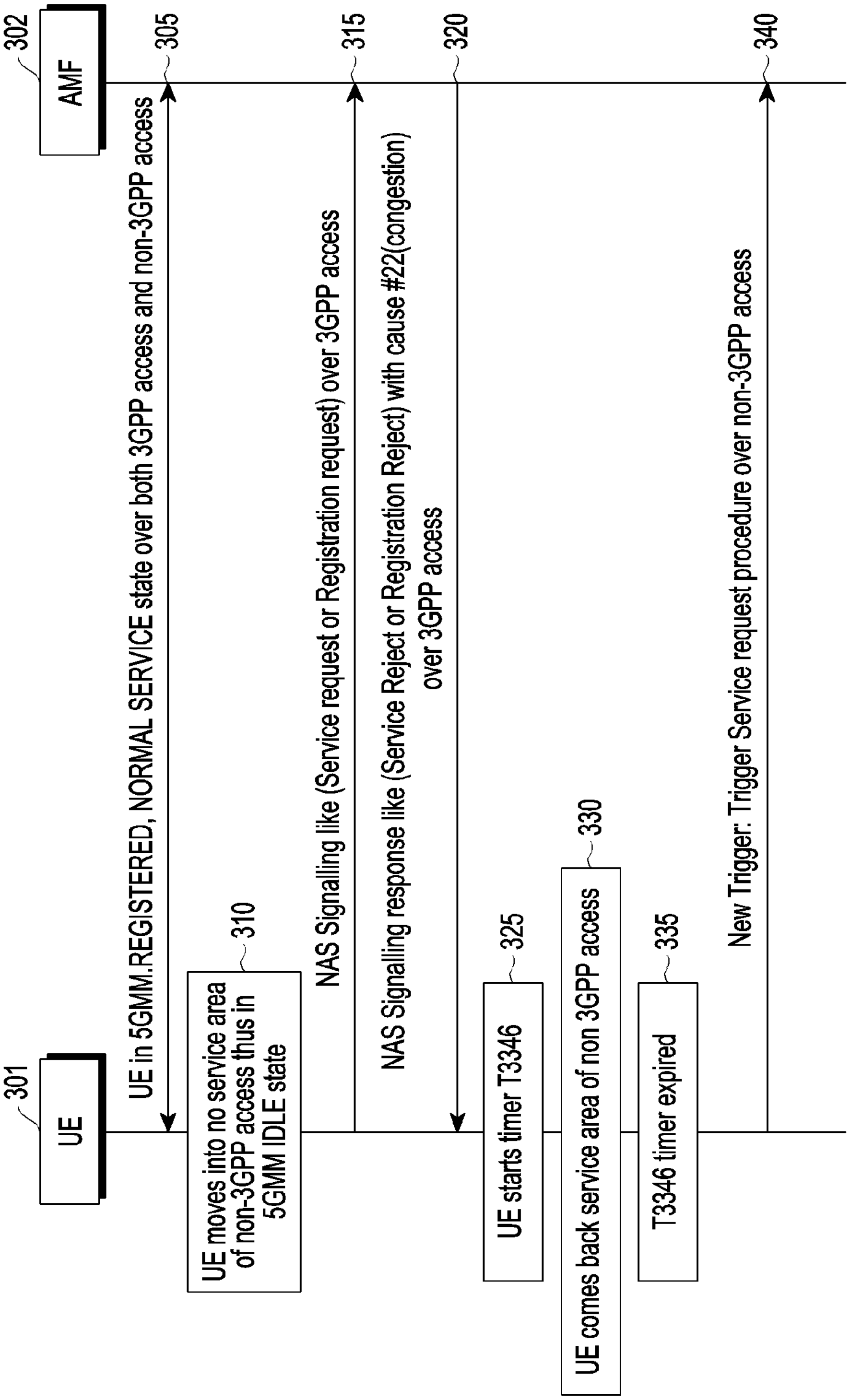
FIG. 3 is a sequence diagram depicting the reception of the MT data packets over N3GPP access, by the UE, after the UE triggers a service request over N3GPP access, within the N3GPP coverage area, according to an embodiment as disclosed herein.
Figure 4:
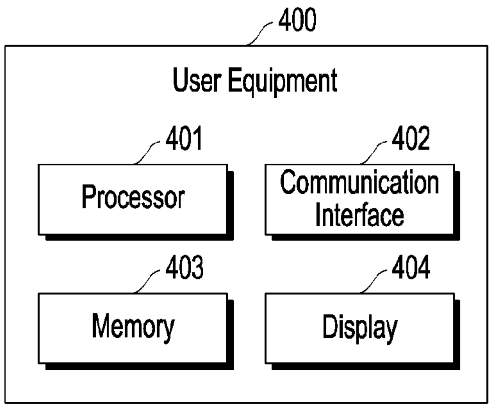
FIG. 4 is a block diagram of the UE according to an embodiment as disclosed herein.

Referring now to the drawings, and more particularly to FIGS. 3 and 4, where similar reference characters denote corresponding features consistently throughout the figures, there are shown preferred embodiments.

FIG. 3 is a sequence diagram depicting the reception of the MT data packets over N3GPP access, by the UE, after the UE triggers a service request procedure over N3GPP access in the N3GPP coverage area, according to embodiments as disclosed herein.

As depicted in FIG. 3, the UE(301) is registered with an AMF(302), which is a core network element of the the 5G network, over 3GPP access and over N3GPP access. The UE(301) is in 5GMM REGISTERED NORMAL SERVICE state over 3GPP access and over N3GPP access(step 305). The UE(301) was in the service area of the N3GPP access network, and has moved out of the service area of the N3GPP access network(step 310). As the UE(301) moves out of the coverage area of the N3GPP access, the UE(301) is no longer connected to the AMF(302) through N3GPP access. The UE(301) is in 5GMM-IDLE mode over N3GPP access.

The UE(301) can determine that the UE(301) is in the coverage area of 3GPP access. Therefore, the UE(301) can send a Service Request or Registration Request to the AMF over 3GPP access. The UE(301) sends the Service Request (a NAS signalling message) over 3GPP access(step 315). Consider that the 5G network is congested. The AMF(302) sends a Service Reject or Registration Reject message (a NAS signalling response message) over 3GPP access(step 320), which includes a cause of rejection of the Service Request with a cause value #22 and a timer T3346.

After receiving the NAS signalling response from the AMF(302), the UE(301) starts the timer T3346(step 325) and determine, based on the cause value, that the 5G network is congested and that the UE(301) needs to back-off from sending further Service Requests prior to the expiry of the timer T3346. When the UE(301) comes back to the service area of N3GPP access(step 330), the UE(301) receives an indication. The indication informs the UE(301) that an access stratum connection has been established between the UE(301) and the 5G network(302).

The UE(301) determines whether the timer T3346 has expired. When the timer T3346 expires(step 335), the UE(301) triggers a Service Request procedure over N3GPP access(step 340). The UE(301) can send Service Request to the AMF(302) (a NAS signalling message). This allows the UE(301) to switch from the 5GMM-IDLE state over N3GPP access to 5GMM-CONNECTED state over N3GPP access, if the Service Request is accepted by the AMF(302). The UE(301) can receive MT data packets from the AMF over N3GPP access.

The back-off timer in this embodiment is for example timer T3346. There is co-ordination between 3GPP access and N3GPP access. The UE(301) performs the co-ordination between 3GPP access and N3GPP access, when the UE(301) is registered with same Public Land Mobile Network (PLMN) over both 3GPP access and N3GPP access. Therefore, the back-off timer is applied to both 3GPP access and N3GPP access. Otherwise, the back-off timer of 3GPP access is not applied to N3GPP access, and the back-off timer of N3GPP access is not applied to 3GPP access.

FIG. 4 is a block diagram of the UE according to an embodiment as disclosed herein.

As depicted in FIG. 4, the UE(400) includes a processor (401), a communication interface(402), a memory(403), and a display(404). Considered that the UE(400) is registered with the 5G network over 3GPP access and over N3GPP access. The UE(400) is in 5GMM REGISTERED NORMAL SERVICE state over 3GPP access and over N3GPP access. Consider that the UE(400) is initially in the service area of the N3GPP access network, and has moved out of the service (coverage) area of the N3GPP access network.

The processor(401) can detect the UE(400) has moved out of the service (coverage) area of the N3GPP access network. The processor(401) can determine that the UE(400) is in 5GMM-IDLE mode over N3GPP access. The processor (401) can send a Service Request or Registration Request, using the communication interface(402), to the 5G network through the 3GPP access network. In an embodiment, the processor(401) can send the Service Request (a Non-Access Stratum (NAS) signalling message), using the communication interface(402), over 3GPP access.

Consider that the 5G network is congested. As such, the processor(401) can receive, from the 5G network, a Service Reject or Registration Reject message (a NAS signalling response message) over 3GPP access using the communication interface(402). In an embodiment, the NAS signalling response message includes a cause of rejection of the Service Request in an Information Element (IE), which includes a cause value #22 (congestion) and a timer T3346. After receiving the NAS signalling response message, the processor(401) starts the timer T3346. The processor(401) can determine, based on the cause value, that the 5G network is congested and that the UE(400) needs to back-off from sending further Service Requests prior to the expiry of the timer T3346. The processor(401) refrains from sending Service Requests prior to the expiry of the timer T3346.

Consider that the UE(400) has come back within the coverage area of the N3GPP access network. The processor (401) can determine that the UE(400) is in the coverage area of the N3GPP access network (such as Wi-Fi network) on receiving an indication. The indication informs that an access stratum connection has been established between the UE(400) and the 5G network. The UE(400), in the 5GMM-IDLE mode, through the communication interface(402), receives the indication from the lower layers of N3GPP access.

The processor(401) can determine whether the timer T3346 has expired. The UE(400) does not trigger a service request procedure over N3GPP access prior to the expiry of the timer T3346. The processor(401) of the UE(400) triggers a Service Request procedure over N3GPP access, once the timer T3346 expires. The processor(401) sends the Service Request (a NAS signalling message) to the 5G network over using the communication interface(402). This allows the UE(400) to switch from the 5GMM-IDLE state over N3GPP access to 5GMM-CONNECTED state over N3GPP access, if the Service Request is accepted by the 5G network. The UE(400) can receive MT data packets over N3GPP access.

FIG. 4 shows exemplary units of the UE(400), but it is to be understood that other embodiments are not limited thereon. In other embodiments, the UE(400) may include less or more number of units. Further, the labels or names of the units of the UE(400) are used only for illustrative purpose and does not limit the scope of the invention. One or more units can be combined together to perform same or substantially similar function in the UE(400).

Figure 5:
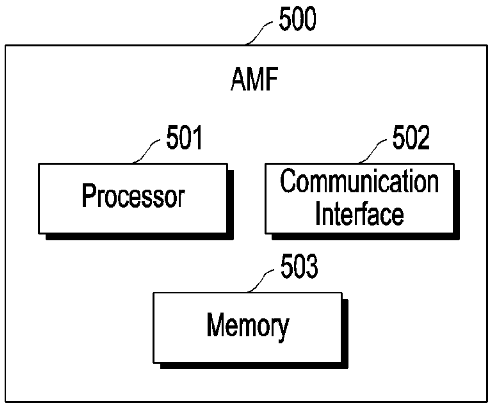
FIG. 5 is a block diagram of the AMF according to an embodiment as disclosed herein.

FIG. 5 is a block diagram of the AMF according to an embodiment as disclosed herein.

As depicted in FIG. 5, the AMF(500) includes a processor (501), a communication interface(502) and a memory(503). Considered that the UE is registered with the 5G network over 3GPP access and over N3GPP access. The UE is in 5GMM REGISTERED NORMAL SERVICE state over 3GPP access and over N3GPP access. Consider that the UE is initially in the service area of the N3GPP access network, and has moved out of the service (coverage) area of the N3GPP access network.

If the UE has moved out of the service (coverage) area of the N3GPP access network and the UE is in 5GMM-IDLE mode over N3GPP access, the processor(501) can receive a Service Request or Registration Request, using the communication interface(502), from the UE the 3GPP access network. In an embodiment, the processor(501) can receive the Service Request (a Non-Access Stratum (NAS) signalling message), using the communication interface(502), over 3GPP access.

Consider that the 5G network is congested. As such, the processor(501) can send, to the UE, a Service Reject or Registration Reject message (a NAS signalling response message) over 3GPP access using the communication interface(502). In an embodiment, the NAS signalling response message includes a cause of rejection of the Service Request in an Information Element (IE), which includes a cause value #22 (congestion) and a timer T3346.

Consider that the UE has come back within the coverage area of the N3GPP access network(such as Wi-Fi network) on receiving an indication. The indication informs that an access stratum connection has been established between the UE and the 5G network. The UE, in the 5GMM-IDLE mode, receives the indication from the lower layers of N3GPP access.

If the timer T3346 has expired, the UE(400) triggers a Service Request procedure over N3GPP access. The processor(501) receives the Service Request (a NAS signalling message) from the UE over using the communication interface(502). The processor(501) determines whether to accept the Service Request from the UE. If the Service Request is accepted by the AMF, this allows the UE to switch from the 5GMM-IDLE state over N3GPP access to 5GMM-CONNECTED state over N3GPP access. The processor(501) can send MT data packets over N3GPP access.

FIG. 5 shows exemplary units of the AMF(500), but it is to be understood that other embodiments are not limited thereon. In other embodiments, the AMF(500) may include less or more number of units. Further, the labels or names of the units of the AMF(500) are used only for illustrative purpose and does not limit the scope of the invention. One or more units can be combined together to perform same or substantially similar function in the AMF(500).

The embodiments disclosed herein can be implemented through at least one software program running on at least one hardware device and performing network management functions to control the network elements. The network elements shown in FIG. 3 include blocks which can be at least one of a hardware device, or a combination of hardware device and software module.

The embodiments disclosed herein describe methods and apparatus for managing the triggering of Service Request procedures by the UE for receiving MT packets over N3GPP access. The UE is configured to trigger a Service Request procedure if the UE detects that the UE is in N3GPP access coverage area, and if the UE detects that the UE is in 5GMM-IDLE mode over N3GPP access. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in example Very high speed integrated circuit Hardware Description Language (VHDL), or any other programming language, or implemented by one or more VHDL or several software modules being executed on at least one hardware device. The hardware device can be any kind of portable device that can be programmed. The device may also include means, which could be, for example, a hardware means, for example, an Application-specific Integrated Circuit (ASIC), or a combination of hardware and software means, for example, an ASIC and a Field Programmable Gate Array (FPGA), or at least one microprocessor and at least one memory with software modules located therein. The method embodiments described herein could be implemented partly in hardware and partly in software. Alternatively, the invention may be implemented on different hardware devices, e.g. using a plurality of Central Processing Units (CPUs).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method of a user equipment (UE), the method comprising:

identifying that the UE is in idle mode over non-3rd generation partnership project (non-3GPP) access and out of a service area of the non-3GPP access;

transmitting, to an access and mobility function (AMF), a first service request message over a 3GPP access;

receiving, from the AMF, a service reject message in response to the first service request message over the 3GPP access, the service reject message including first information for a T3346 timer;

starting the T3346 timer based on the first information for the T3346 timer;

receiving, from lower layers of the non-3GPP access, an indication indicating that an access stratum connection has been established between the UE and a network;

identifying that the T3346 timer is expired; and in response to initiating a service request procedure based on the UE being in idle mode but present in the service area of the non-3GPP access, the indication, and the T3346 timer being expired, transmitting, to the AMF, a second service request message over the non-3GPP access, wherein the UE is registered with same public land mobile network (PLMN) over both the 3GPP access and the non-3GPP access, the T3346 timer is applied to both the 3GPP access and the non-3GPP access.

2. The method of claim 1, wherein the service reject message further includes second information indicating that the network is congested.

3. A user equipment (UE), the UE comprising:

a transceiver; and a processor configured to:

identify that the UE is in idle mode over non-3rd generation partnership project (non-3GPP) access and out of a service area of the non-3GPP access, transmit, to an access and mobility function (AMF), a first service request message over a 3GPP access, receive, from the AMF, a service reject message in response to the first service request message over the 3GPP access, the service reject message including first information for a T3346 timer, start the T3346 timer based on the first information for the T3346 timer, receive, from lower layers of the non-3GPP access, an indication indicating that an access stratum connection has been established between the UE and a network, identify that the T3346 timer is expired, and in response to initiating a service request procedure based on the UE being in idle mode but present in the service area of the non-3GPP access, the indication, and the T3346 timer being expired, transmit, to the AMF, a second service request message over the non-3GPP access, wherein the UE is registered with same public land mobile network (PLMN) over both the 3GPP access and the non-3GPP access, the T3346 timer is applied to both the 3GPP access and the non-3GPP access.

4. The UE of claim 3, wherein the service reject message further includes second information indicating that the network is congested.

* * * * *